(12) United States Patent
Turtiainen et al.

(10) Patent No.: US 6,724,752 B1
(45) Date of Patent: Apr. 20, 2004

(54) IP TELECOMMUNICATIONS

(75) Inventors: Esa Turtiainen, Espoo (FI); Tommi Linnakangas, Helsinki (FI); Harri Toivanen, Kirkkonummi (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 790 days.

(21) Appl. No.: 09/610,930

(22) Filed: Jul. 6, 2000

(30) Foreign Application Priority Data

Jul. 14, 1999 (GB) .......................................... 99163384

(51) Int. Cl.7 .............................................. H04L 12/66
(52) U.S. Cl. ........................ 370/352; 370/401; 370/466; 370/467; 370/395.42; 709/230; 709/232; 709/236
(58) Field of Search ................................ 370/466, 467, 370/351, 352, 395.2, 395.42, 401, 353–357, 469; 709/230, 232, 236

(56) References Cited

U.S. PATENT DOCUMENTS 6,529,524 B1 * 3/2003 Liao et al. .................. 370/467
6,611,533 B1 * 8/2003 Liao et al. .................. 370/467
6,614,781 B1 * 9/2003 Elliott et al. ................ 370/352

FOREIGN PATENT DOCUMENTS

| EP | 0789470 A2 | 8/1997 |
| WO | 97/16007 | 5/1997 |
| WO | 98/36543 | 8/1998 |

OTHER PUBLICATIONS

Media Gateway control protocol and voice over IP gateways (I–P Anquetil, J. Bouwen, A Conte, B. Van Doorselaer).*

* cited by examiner

*Primary Examiner*—Wellington Chin
*Assistant Examiner*—Chuong Ho

(57) ABSTRACT

A telecommunications system comprises a signalling network and a Voice over IP (VoIP) network. The signalling network in turn comprises gateway signalling points 6,7 for converting signalling messages between at least two different signalling protocols. The IP network comprises IP nodes 4 for routing IP datagrams, with at least certain of the IP nodes 4 being co-located with respective gateway signalling points 6,7, and with the co-located signalling points 6,7 being arranged in use to pass routing information to the respective IP nodes 4 to enable those nodes to prioritise and route incoming IP datagrams.

6 Claims, 2 Drawing Sheets

IP TELECOMMUNICATIONS

BACKGROUND

The present invention relates to IP telecommunications and more particularly to the use of IP technology for transmitting voice and other user traffic in a telecommunications system.

In conventional telecommunications networks, voice data and other user generated data is sent between telephone exchanges or "switches" using time division multiplexing over Synchronous Transfer Mode (STM) networks. In Europe, the E.1 transmission protocol is used which divides time frames into slots such that corresponding slots in successive frames provide a 64 Kbits/second data channel. In the USA, a similar transmission protocol, referred to as T.1, is used.

A call connection is set up by reserving an end-to-end data channel between the originating exchange and the terminating exchange (possibly via one or more intermediate or "transit" switches). The signalling necessary to set-up the connection, as well as to control and terminate the connection, uses the ISDN User Part (ISUP) signalling protocol which forms part of a Signalling System no.7 (SS7) signalling protocol stack. More particularly, a connection is reserved by propagating an ISUP Initial Address Message (IAM) from the originating exchange to the terminating exchange, the IAM containing an identification of the originating and terminating exchanges using so-called "Point Codes" (PCs). For each inter-exchange link in the connection, the IAM carries forward an identification of the channel to be reserved for the connection. This identification is referred to as a Circuit Identification Code (CIC).

There currently exists a high level of interest in employing Internet Protocol (IP) technology in telecommunications networks both for the transmission of signalling traffic (e.g. ISUP messages) and user data. The advantages of using IP are an increase in network capacity due to replacing circuit switched channels with packet switched channels and potential cost savings due to the low cost of IP systems relative to conventional telecommunications systems.

In the event that two telephone exchanges are coupled via a conventional IP network for the transmission of user data, the IP network will route the data in the form of a sequence of IP datagrams between successive IP routers. The routers rely on so-called "best efforts" to relay datagrams which means that datagrams are forwarded to the next router in the chain only if capacity on the interconnecting link is available. If sufficient capacity does not exist, then the packet is discarded, and a message returned to the originating switch advising that switch to resend the packet. It will be appreciated that this best efforts transmission service is not well suited to voice telephony or other forms of data transmission where real time or close to real time transmission is required.

ISUP comes in a number of national variants characterising different regulatory environments. Even within a given country, different operators may use different ISUP protocols which in turn differ from the inter-national ISUP protocol(s). In conventional telecommunication networks, gateway exchanges are able to convert between the ISUP variant of its home network and the variants of the "foreign" networks to which it is connected. Thus only a limited number of conversions are required at any one gateway exchange.

Consider now the situation which arises if two PSTNs are coupled via a Voice over IP (VoIP) network. ISUP signalling messages must be transferred between the two gateway nodes of the PSTNs and this may be done over that same IP network or over some other network. If the VoIP network replaces for example an International trunk then every gateway node connecting to the VoIP network must be able to convert ISUP messages of its home network into every one of the other national ISUP variants (which exist for foreign networks also coupled to the same VoIP network) and vice versa. This problem arises because a sequence of ISUP conversions is no longer carried out as the ISUP messages are passed along a chain of gateway exchanges.

Assuming that there are 60 national ISUP variants, then each gateway exchange must be capable of handling 60×60 or 3600 ISUP conversions. The provision of this number of conversions is difficult or even impossible to provide in practice.

SUMMARY

It is an object of the present invention to overcome or at least mitigate the above noted disadvantage. It is a second object of the present invention to enable the transmission of user data using IP such that the delivery of the data is guaranteed. It is a third object of the present invention to reduce the number of ISUP conversions which must be provided for in a given gateway switch.

These and other objects are achieved at least in part by co-locating certain IP nodes of the IP network with gateway signalling points of the signalling network.

According to a first aspect of the present invention there is provided a telecommunications system comprising a signalling network and a Voice over IP (VoIP) network, the signalling network comprising gateway signalling points for converting signalling messages between at least two different signalling protocols and the IP network comprising IP nodes for routing IP datagrams, at least certain of the IP nodes being co-located with respective gateway signalling points, the co-located signalling points being arranged in use to pass routing information to the respective IP nodes to enable those nodes to prioritise and route incoming IP datagrams.

According to a second aspect of the present invention there is provided a method of setting up a call connection over a sequence of nodes of an Internet Protocol (IP) network, where each of said nodes is co-located with a signalling point of an SS7 signalling network, and with each IP node being identified by an IP address and each SS7 signalling point being identified by a Point Code (PC), the method comprising:

allocating to each link of the connection, at the SS7 signalling point level, a Circuit Identification Code;

notifying each IP node of the CIC of the or each link to a neighbouring IP node, and of the PC of the or each neighbouring signalling point;

at each IP node, translating the received PC and CIC combination(s) into an IP address and port number for the or each neighbouring IP node; and defining at each IP node a priority delivery service for datagrams received from the or each IP address and port number combination.

It will be appreciated that once the connection is set-up between the sequence of IP nodes, an IP datagram received at an IP node can be analysed on the basis of either the IP address and port number from which it originated or the IP address and port number to which it is delivered to determine whether or not delivery of the datagram to the next IP node in the sequence is a priority action. It will also be appreciated that the IP addresses and port numbers derived for neighbouring nodes and channels may be used to route outgoing datagrams. For example, for a given connection, the IP node may contain mapped pairs of IP addresses and port numbers, e.g. $\{(IP_1,PNo_1),(IP_2,PNo_2)\}$, such that a datagram received from one of the pair $(IP_2,PNo_2)$ is routed as a priority to the other of the pair $(IP_2,PNo_2)$.

The method of the present invention may be used to provide a call connection between two Plain Old Telephone Systems (POTS), where each of the POTS comprises a gateway node which converts user data between an IP format and a POTS format. Alternatively, the invention may be used to connect two Internet enabled terminals via respective access networks, where user data is transferred across the access networks in an IP format. The local exchange of such an IP enabled terminal may, for example, maintain a register mapping terminal (or subscriber) telephone numbers to IP addresses.

Whilst one suitable use for the method of the present invention is the setting up of Voice over IP calls, it will be appreciated that the invention also applies to setting up connections for the transfer of other forms of user data, e.g. facsimile, video conferencing.

According to a third aspect of the present invention there is provided a method of relaying datagrams at a node of an IP network which node is co-located with a signalling point of an SS7 network, wherein the IP node retains a set of IP address and port number combinations derived on the basis of PC and Circuit Identification Code (CIC) combinations passed to it by the co-located signalling point and identifying priority datagram transmissions, the method comprising:

receiving an IP datagram at said IP node;

comparing the originating IP address and port number combination of the received datagram with said set of IP address and port number combinations; and in the event that said originating IP address and port number combination are contained in the list, relaying the datagram to a subsequent IP node as a priority and, in the event that said originating IP address and port number combination are not contained in the list, using only best effort to relay the datagram to a subsequent IP node.

According to a fourth aspect of the present invention there is provided a node of an IP network, the node being arranged to be coupled to neighbouring nodes for the purpose of setting up a call connection, and each of the nodes being arranged to be co-located with respective signalling points of an SS7 signalling network, the node comprising:

first processing means for receiving Point Code (PC) and Circuit Identification Code (CIC) combinations passed to the node by the co-located signalling point, which combinations identify priority datagram transmissions, and for deriving IP address and port number combinations on the basis of said PC and CIC combinations;

a memory for storing said set of IP address and port number combinations;

receiving means for receiving an IP datagram sent from one of said neighbouring nodes; and second processing means for comparing the originating IP address and port number combination of the received datagram with said stored set of IP address and port number combinations and, in the event that said originating IP address and port number combination are contained in the list, for relaying the datagram to a subsequent IP node as a priority and, in the event that said originating IP address and port number combination are not contained in the list, for using only best effort to relay the datagram to a subsequent IP node.

DETAILED DESCRIPTION

Figure 1:
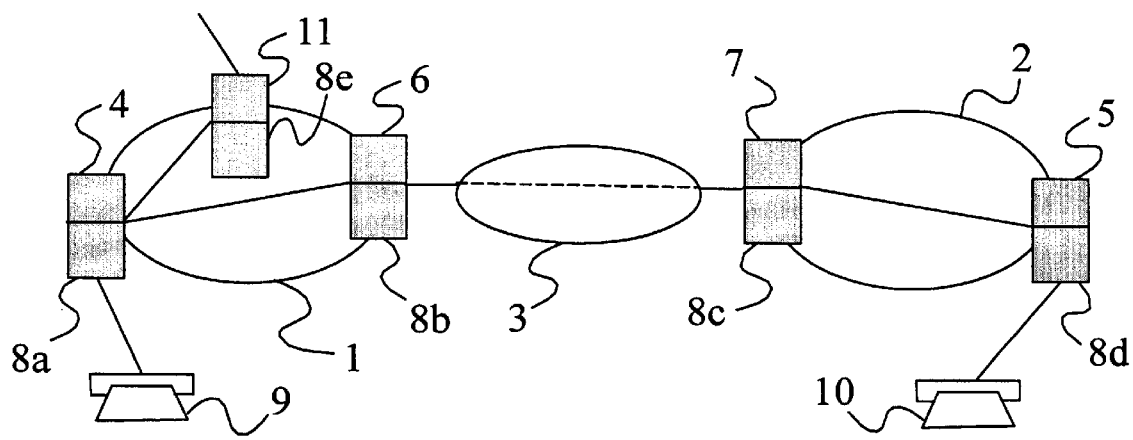
FIG. 1 illustrates schematically a telecommunications system employing Voice over IP.

There is illustrated in FIG. 1 a telecommunications system comprising two national telephone networks 1,2 interconnected by an international network 3. At the signalling level, call connections are set-up and controlled using an SS7 signalling network to exchange ISUP messages between SS7 signalling points which correspond to a call originating exchange 4 and a call terminating exchange 5. The SS7 network may make use of a conventional Synchronous Transfer Mode network to carry ISUP signalling messages or may use an IP based network. It is assumed here that the two national networks 1,2 use respective national ISUP variants, whilst the international network 3 uses a further ISUP variant.

Each of the national networks 1,2 comprises a gateway signalling transfer point 6,7 which provides the interface between the national network 1,2 and the international network 3. A gateway signalling point 6,7 is capable of handling translations between the national ISUP variant of its home network and that of the international network 3. The gateway signalling point 6,7 is also able to translate ISUP messages to and from any ISUP variants of other networks to which it is connected. FIG. 1 illustrates a second gateway signalling point 11 of the national network 1 which may be connected to another national or international network (not shown). It will be appreciated that the total number of different ISUP translations required at a gateway signalling point 6,7,11 is relatively small.

Figure 2:
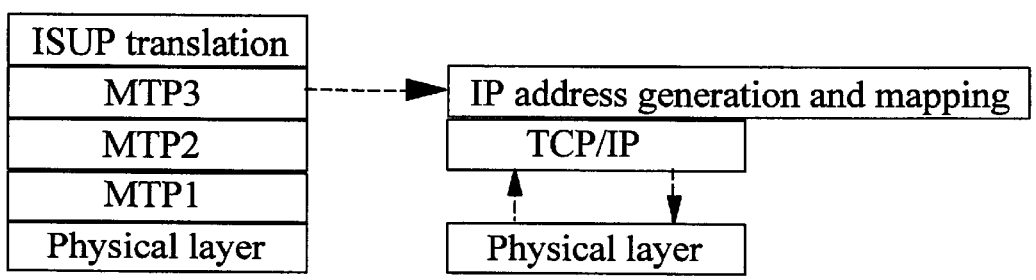
FIG. 2 illustrates the structure of a co-located SS7 signalling point and IP node of the system of FIG. 1.

The signalling or Call Control plane is distinct from the user data or bearer plane. The user plane uses IP protocol to transmit user data such as voice, facsimile, etc. The bearer plane comprises a set of IP nodes or routers 8, each of which is co-located with a signalling point 4 to 7 of the Call Control plane. FIG. 2 illustrates schematically the protocol structure present at a co-located signalling point/IP node. The operation of a co-located signalling point/IP node is best illustrated by way of example.

Consider the situation where a subscriber 9 of one of the national networks 1, having exchange 4 as his local exchange, initiates a call to a subscriber 10 of the other national network 2 whose local exchange is the exchange 5. On the basis of the call destination, i.e. the location of the called subscriber 10, the SS7 signalling point of the local exchange 4 determines the Point Code (PC) identifying the next signalling point 6 in the connection to the called subscriber's local exchange 5. The originating signalling point also allocates a channel to the call connection. Using conventional terminology, the allocated channel is identified by a Circuit Identification Code (CIC).

The originating signalling point forwards an Initial Address Message (IAM) to the next signalling point 6 in the sequence on the basis of the determined PC. The IAM also contains the allocated CIC as well as the PC of the originating signalling point and the PC of the destination signalling point 6 (or some other identification of that point such as the called subscriber's phone number). At the originating signalling point, the next hop PC and allocated CIC are passed to the co-located IP node 8a. The IP node 8 translates these into a 32 bit IP address and 16 bit port number as follows:

IP address-xxxxxxxx.xxxxxxxx.xnnyyyyy.yyyyyyyz

Port number-wwwwwwwwwwwwzzzz.

Supposing that the network operator has a range of C-class network addresses:

194.222.0.0 =11000010.11011110.00000000.00000000.

If the Network Indicator (NI) is 0, i.e. nn=0, the PC is 4 (yyyyy.yyyyyyy=00000.0000100), CIC is 444 (wwwwwwwwwwwww=00011011100), then:

IP address-11000010.11011110.00000000.00001000 (i.e. 194.222.0.8) and Port number-0001101111000000 (i.e. 7104).

It will be appreciated that the CIC only affects the port number, whilst the NI and PC affect the IP address (both network and host parts).

Note that the IP address uniquely defines the next hop IP node 8b within the IP network.

Upon receipt of the IAM at the next hop signalling point 6, the signalling point 6 passes the CIC allocated to the first link and the PC of the originating signalling point to the co-located IP node 8b. Using these, the IP node 8b is able to determine the IP address and port number from which future messages for this connection will originate. The IP node 8b adds this IP address and port number to a priority list. The first hop signalling point 6 then determines the PC of the second hop signalling point 7 and allocates a CIC to the second link. An LAM is then forwarded to the second hop signalling point 7 and the process repeated until the LAM reaches the destination exchange 5.

Voice data received at the originating IP node 8a is formatted into datagrams and is forwarded to the derived IP address and port number, i.e. to the next hop IP node 8b. The source and destination IP addresses and port numbers are identified in the datagram. Upon receipt of each datagram; the receiving IP node 8b compares the destination IP address and port number with its own address and port number. Assuming that the result of the comparison is positive, the source IP address and port number contained within the datagram are compared with those IP addresses and port numbers contained in the priority list. If the source IP address and port number is found in the list, then the IP node 8b replaces the source IP address and port number contained in the received datagram with its own IP address and port number, and replaces the original destination IP address and port number with the IP address and port number of the next hop IP node 8c. The datagram is then delivered as a priority, i.e. without significant delay.

Assuming that the IP node 8b is currently handling "normal" IP datagrams on a best efforts basis, certain such datagrams may be discarded to free capacity for the priority datagrams. Of course, if a datagram is received at the IP node 8b which does not originate from an IP address contained in the priority list, the datagram is routed only on a best efforts basis.

Figure 3:
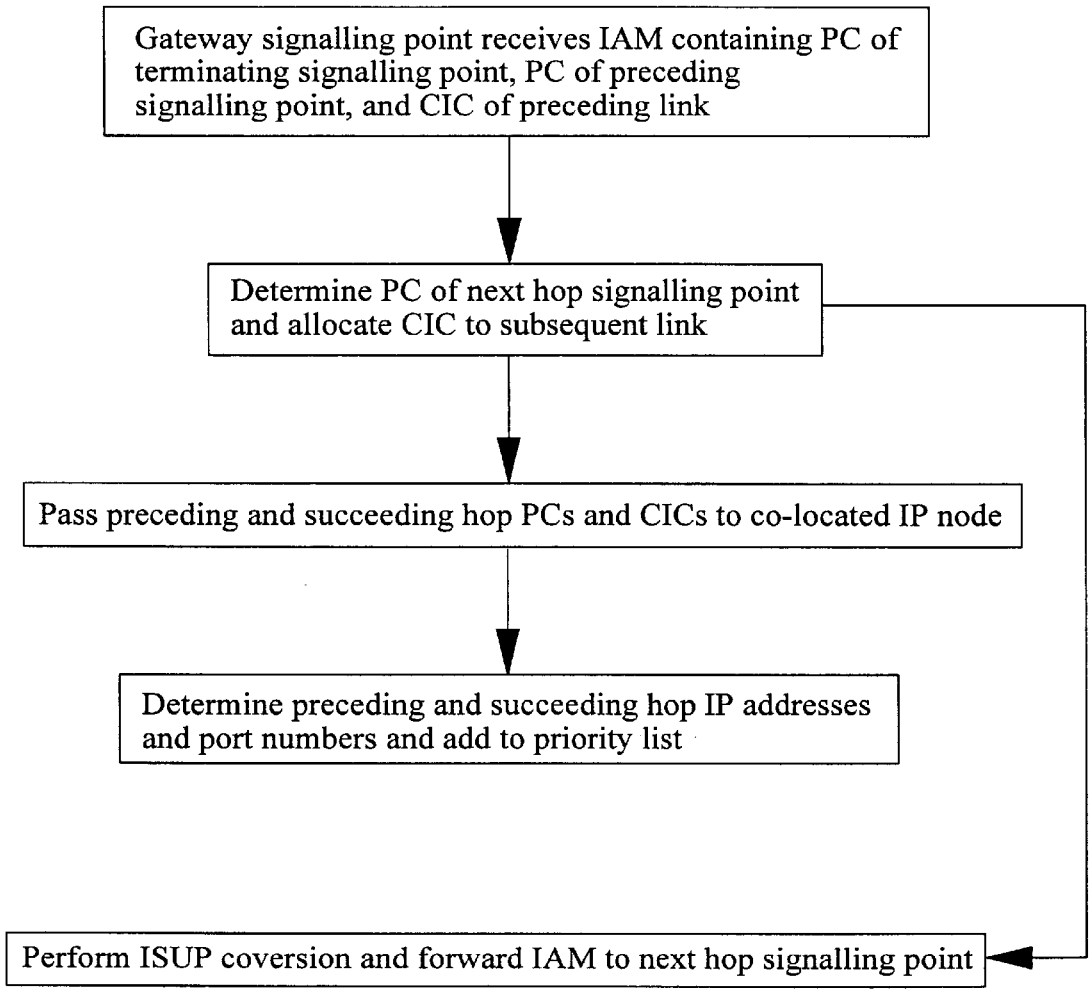
FIG. 3 is a flow diagram illustrating a method of operation of the system of FIG. 1.

FIG. 3 is a flow diagram illustrating the call set-up method described above.

The network architecture described above overcomes the requirement of conventional VoIP architectures for a large number of possible ISUP variation translations at a few gateway nodes, by making use of a larger number of gateway nodes along the transmission path.

It will be appreciated by the skilled person that various modifications may be made to the above described embodiment without departing from the scope of the present invention.

What is claimed is:

1. A method of setting up a call connection over a sequence of Internet Protocol (IP) nodes of an IP network, wherein each of the IP nodes is co-located with a signaling point of an SS7 signaling network, and wherein each IP node is identified by an IP address and each SS7 signaling point is identified by a Point Code (PC), the method comprising:

allocating to each link of the connection, at the SS7 signaling point level, a Circuit Identification Code (CIC);

notifying each IP node of the CIC of each link to a neighboring IP node, and of the PC of each neighboring signaling point;

at each IP node, translating the received PC and CIC combination(s) into an IP address and port number combination for each neighboring IP node;

deriving, from the received PC and CIC combinations, a set of IP address and port number combinations identified with priority datagram transmissions; and if a datagram having an originating IP address and port number combination contained in the set is received in the IP node, then relaying the datagram to a subsequent IP node as a priority and, if the originating IP address and port number combination are not contained in the set, using only best efforts to relay the datagram to a subsequent IP node.

2. A method according to claim 1, wherein the method is used to provide a call connection between two Plain Old Telephone System (POTS) networks, where each of the POTS networks comprises a gateway node which converts user data between an IP format and a POTS format.

3. A method according to claim 1, wherein the method is used to connect two IP-enabled terminals via respective access networks, where user data is transferred across the access networks in an IP format.

4. A method according to claim 3, wherein each local exchange IP-enabled terminal maintains a register that maps telephone numbers to IP addresses.

5. A method of relaying datagrams at an Internet Protocol (IP) node of an IP network, said IP node being co-located with a signaling point of an SS7 network, wherein the IP node retains a set of IP address and port number combinations derived on the basis of Point Code PC and Circuit Identification Code (CIC) combinations passed to it by the co-located signaling point and identifying priority datagram transmissions, the method comprising:

receiving an IP datagram at said IP node;

comparing the originating IP address and port number combination of the received datagram with said set of IP address and port number combinations; and if the originating IP address and port number combination are contained in the set, then relaying the datagram to a subsequent IP node as a priority, and if the originating IP address and port number combination are not contained in the set, using only best efforts to relay the datagram to the subsequent IP node.

6. A node of an IP network, the node being arranged to be coupled to neighboring nodes for the purpose of setting up a call connection, and each of the nodes being arranged to be co-located with respective signaling points of an SS7 signaling network, the node comprising:

first processing means for receiving Point Code (PC) and Circuit Identification Code (CIC) combinations passed to the node by the co-located signaling point, said combinations identifying priority datagram transmissions, said first processing means deriving IP address and port number combinations on the basis of said PC and CIC combinations;

a memory for storing a set of IP address and port number combinations associated with priority datagram transmissions;

receiving means for receiving an IP datagram sent from a neighboring node, said received IP datagram including an originating IP address and port number combination; and second processing means for comparing the originating IP address and port number combination of the received datagram with said stored set of IP address and port number combinations, and if the originating IP address and port number combination are contained in the set, then relaying the datagram to a subsequent IP node as a priority, and If the originating IP address and port number combination are not contained in the set, then using only best efforts to relay the datagram to a subsequent IP node.

* * * * *